United States Patent [19]

Kawasaki et al.

[11] Patent Number: 5,068,680
[45] Date of Patent: Nov. 26, 1991

[54] REAR CONVERTER FOR INTERCHANGEABLE LENS CAMERA

[75] Inventors: Masahiro Kawasaki; Osamu Sato, both of Tokyo, Japan

[73] Assignee: Asahi Kogaku Kogyo K.K., Tokyo, Japan

[21] Appl. No.: 455,876

[22] Filed: Dec. 28, 1989

Related U.S. Application Data

[60] Continuation of Ser. No. 192,560, May 11, 1988, abandoned, which is a division of Ser. No. 116,820, Nov. 5, 1987, abandoned.

[30] Foreign Application Priority Data

Nov. 6, 1986 [JP] Japan ............................... 61-262676
Nov. 6, 1986 [JP] Japan ............................... 61-262677

[51] Int. Cl.⁵ .............................................. G03B 17/00
[52] U.S. Cl. ..................................................... 354/286
[58] Field of Search ............... 354/286, 195.12, 289.12

[56] References Cited

U.S. PATENT DOCUMENTS

| | | | |
|---|---|---|---|
| 4,548,488 | 10/1985 | Honda et al. | 354/286 X |
| 4,571,630 | 2/1986 | Tamagawa et al. | 358/226 |
| 4,758,854 | 7/1988 | Saegusa | 354/286 |

FOREIGN PATENT DOCUMENTS

| | | |
|---|---|---|
| 2536075 | 3/1977 | Fed. Rep. of Germany . |
| 162531 | 9/1984 | Japan . |
| 188622 | 10/1984 | Japan . |
| 4916 | 1/1985 | Japan . |
| 234141 | 10/1986 | Japan . |

*Primary Examiner*—W. B. Perkey
*Attorney, Agent, or Firm*—Sughrue, Mion, Zinn, Macpeak & Seas

[57] ABSTRACT

A rear converter for use between a detachable photographing lens and a camera body which can be used with both AE (automatic exposure) and AF (autofocusing) lenses and camera bodies. One example of the converter according to the present invention includes a body mount matable with a camera body mount; a lens mount matable with a photographing lens mount of a photographing lens; a lens system including an automatic focusing movable lens; storing means for storing at least characteristic data for said rear converter; a first group of electrical contacts provided on said body mount, said first group of electrical contacts being capable of electrically contacting with electrical contacts provided on said camera body mount; a second group of electrical contacts provided on said lens mount for transmitting a signal for identifying said photographing lens to said storing means, said second group of electrical contacts being capable of electrically contacting with electrical contacts provided on said photographing lens mount; a first electrical contact provided on said body mount; a second electrical contact provided on said lens mount and grounded electrically; and driving force transmitting means for transmitting driving force from said camera body to said movable lens.

9 Claims, 12 Drawing Sheets

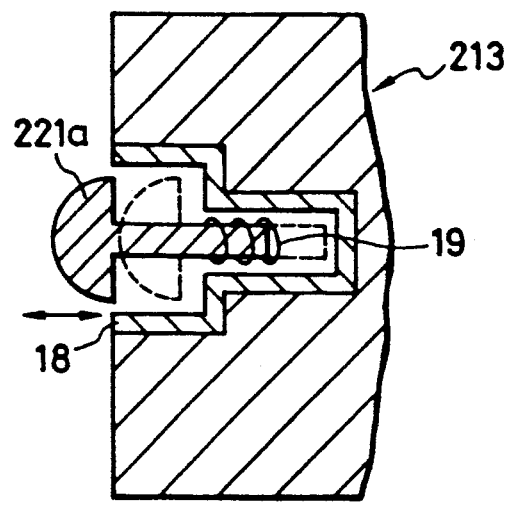
FIG. 3
PRIOR ART
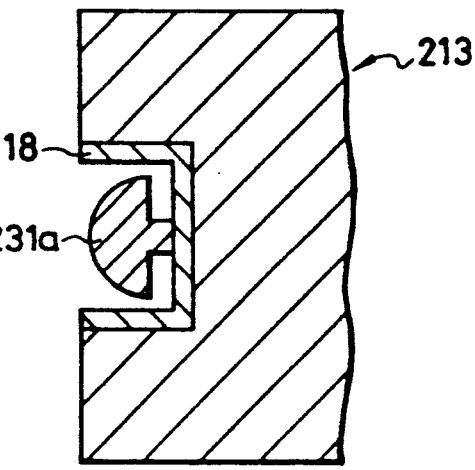
FIG. 4
PRIOR ART
FIG. 5 PRIOR ART
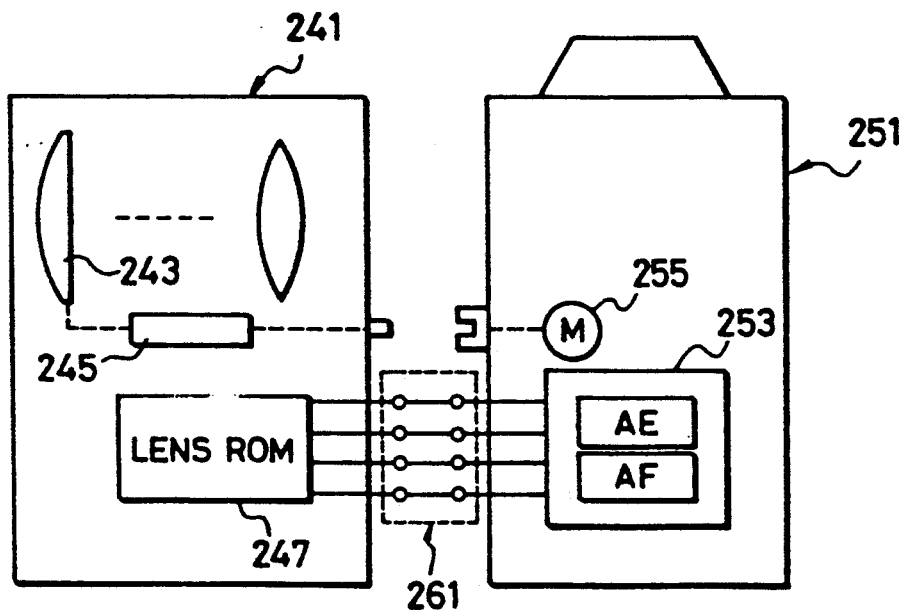

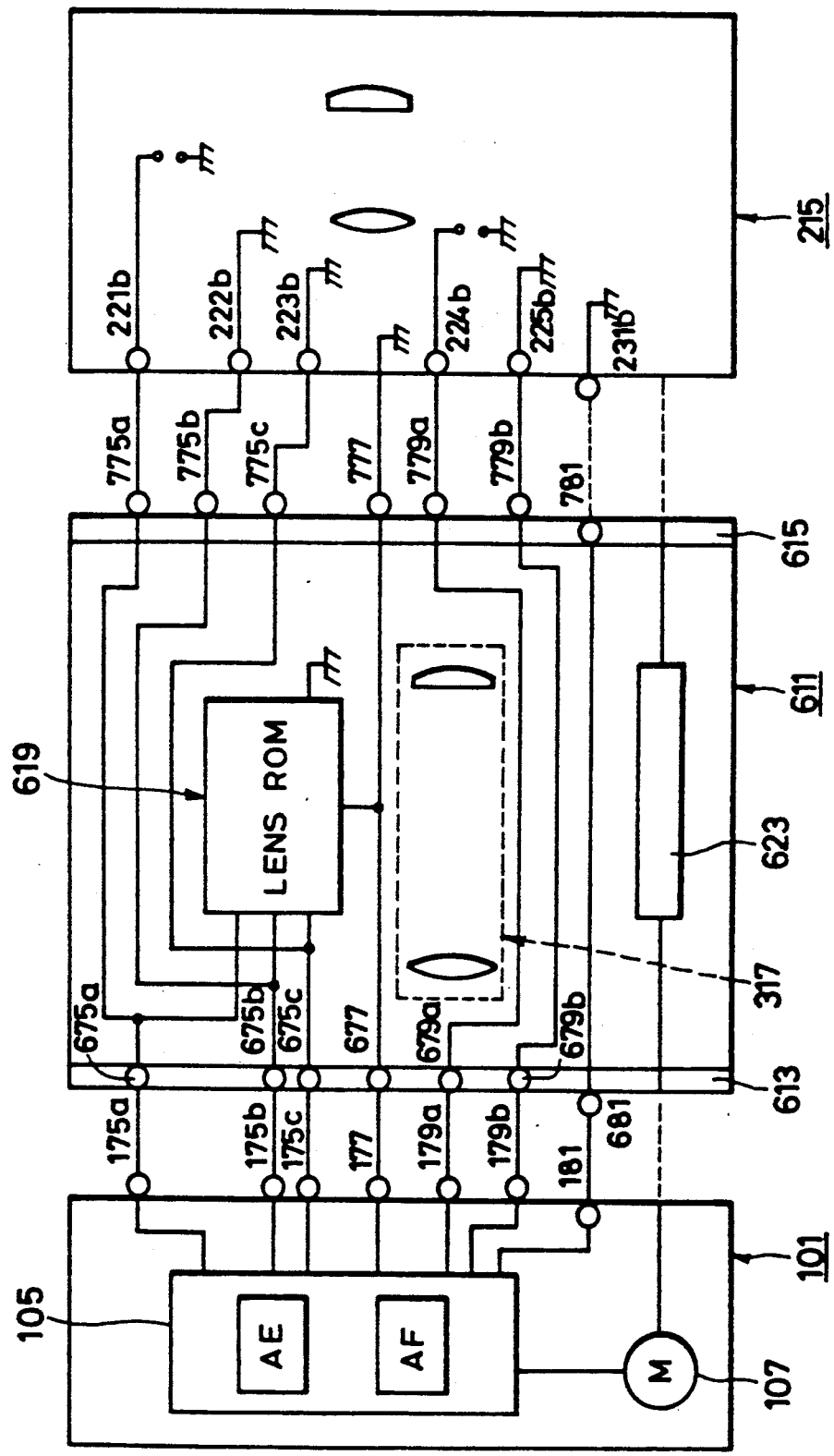

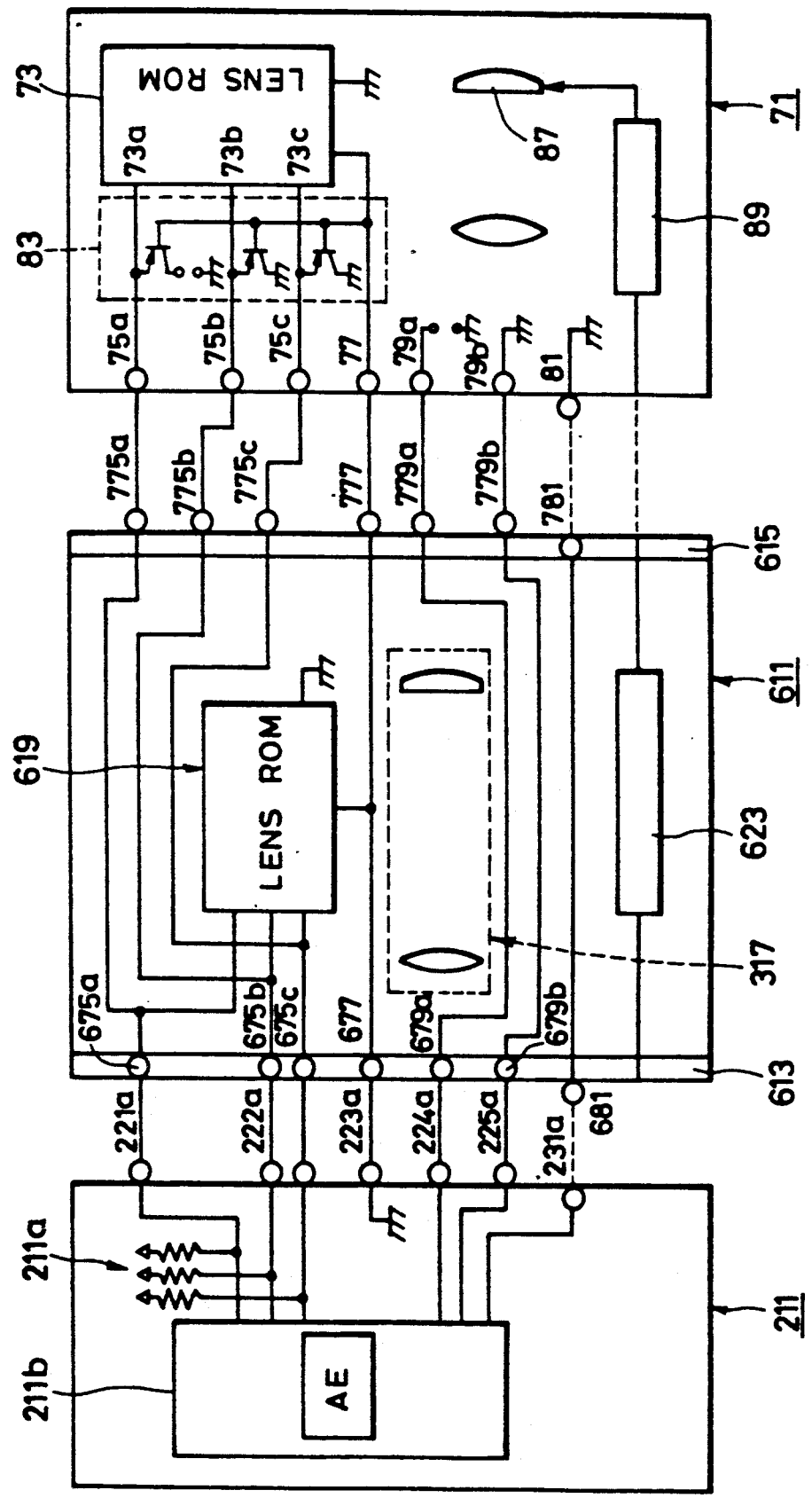

REAR CONVERTER FOR INTERCHANGEABLE LENS CAMERA

This is a Continuation of application Ser. No. 07/192,560, filed 5/11/88, which is a Division of application Ser. No. 07/116,820 filed 11/5/87, both now abandoned.

BACKGROUND OF THE INVENTION

The present invention relates to a rear converter for use in a camera having interchangeable lenses. More particularly, the invention relates to a rear converter which can be used between a camera body having an AF/(auto-focusing) capability and a conventional interchangeable photographing lens having no AF capability so as to enable the conventional photographing lens to be used for AF photography.

Generally, a lens-interchangeable camera has an AE (automatic exposure) capability. For execution of such AE, data of lens characteristic values such as an open lens-stop value (full-opened diaphragm value) and a minimum lens-stop value (full-closed diaphragm value) for each photographing lens and data for change-over between automatic exposure control mode and manual exposure control mode must be transmitted to the camera body. Accordingly, data-transmission electrical contacts are provided both on the camera body and on the photographing lens so as to be connected in a predetermined relation.

An example of such data-transmission electrical contacts, as disclosed in Japanese Patent Unexamined Publication No. 162531/1984 filed by the present applicant, is shown in FIGS. 1 through 4.

The design of the aforementioned electrical contacts takes into account the fact that the AF body is designed to receive lenses having an AF capability as well as conventional photographing lenses which have no AF capability.

A photographing lens having an AF capability and capable of being mounted on the AF body is described in Japanese Patent Application Publication No. 234141/1986, also filed by the present applicant. This photographing lens is also designed to be usable with conventional camera bodies which have no AF capability, based on the same design philosophy as described above for the AF body.

For camera users who use only the AF body, it is, however, unnecessary for photographing lenses to be usable with other camera bodies. Such photographing lenses are provided as exclusive parts. By providing these photographing lenses as exclusive parts, the cost of the lenses can be reduced.

In FIGS. 1 to 4, reference numeral 211 designates a camera body, 213 a mount of the camera body, 215 a photographing lens, and 217 a mount of the photographing lens.

Each of the mounts 213 and 217 is also made of an electrically conductive material, for example, a material prepared by applying a plating treatment or the like to brass. Each of the mounts 213 and 217 serves as a connector between the camera body 211 and the photographing lens 215 and as an electrical ground.

The mount 213 of the camera body 211 is provided with an electrical contact group 227, for example, a group composed of five electrical contacts 221a, 222a, 223a, 224a and 225a electrically insulated from the mount 213 and arranged so as to be projectable from the surface of the mount 213.

The aforementioned electrical contacts are provided on the mount 213 and 217 in the manner to now be described.

FIG. 1 is a front view showing the camera body 101 seen from the mount. FIG. 2 is a rear view of a lens used with the camera body shown in FIG. 1. FIG. 3 is a schematic sectional view taken along a line I—I in FIG. 1 showing the electrical contact 221a. Similarly, FIG. 4 is a schematic sectional view taken along a line II—II in FIG. 1 showing the electrical contact 231a.

Each of the electrical contacts designated by reference numerals 221a, 223a, 224a, and 225a is electrically insulated from the mount 213 and is provided so as to be able to project from the surface of the mount. That is, as shown typically by the contact indicated by reference numeral 221a in FIG. 3, each of the electrical contacts is electrically insulated from the mount 213 by an insulating layer 18 and normally projects from the surface of the mount 213 (as shown by the solid line in FIG. 3). Further, each of the contacts is provided with a spring 19 which urges the contact against the mating contact when a photographing lens or rear converter is mounted to the camera body 211 (as shown by the broken line of FIG. 3).

The electrical contact designated by reference numeral 231a is electrically insulated from the mount 213 and provided so as to be unable to project from the surface of the mount (FIG. 4). The structure of the contacts 221a, 222a, 223a, 224a and 225a is as illustrated in FIG. 3.

The mount 217 of the photographing lens 215 is provided with an electrical contact group 229 corresponding to the electrical contact group 227. The electrical contact group 229 is composed of five electrical contacts 221b, 222b, 223b, 224b and 225b as shown in FIG. 2, which are not projectable from the surface of the mount 217 and which are electrically insulated from the mount 217. That is, the contacts 221b, 222b, 223b, 224b and 225b are constructed as illustrated in FIG. 4.

Further, the mount 213 of the camera body 211 is provided with another electrical contact 231a electrically insulated from the mount 213 and arranged so as to not project from the surface of the mount 213. That is, the structure is the same as that illustrated in FIG. 4. The mount 217 of the photographing lens 215 is also provided with an electrical contact 231b corresponding to the electrical contact 231a, the electrical contact 231b being electrically insulated from the mount 217 and arranged so as to be able to project from the surface of the mount 217 as shown in FIG. 3.

When the aforementioned photographing lens 215 is mounted on the aforementioned camera body 211, respective data are transmitted as follows. The data of the open lens-stop value is transmitted through three pairs of contacts (221a, 221b), (222a, 222b) and (223a, 223b) included in the electrical contact groups 227 and 229. The data of the minimum lens-stop value is transmitted through two pairs of contacts (224a, 224b) and (225a, 225b) included in the electrical contact groups 227 and 229. The data for change-over between automatic exposure control mode and manual exposure control mode is transmitted through the electrical contact 231a (as described in detail later). For example, the data of lens characteristic values are transmitted as follows.

The contacts included in the lens-side electrical contact group 229 are pretreated corresponding to the type of the photographing lens such that some contacts are coated with an insulating material while others are not and are free to make electrical connections with corresponding contacts on the body-side mount. A voltage is supplied through body-side pull-up resistors so that the voltage level at each of the insulated contacts is raised and the voltage level at each of the other contacts connected to the mount (grounded contacts) is reduced. Thus, the data of lens characteristic values is obtained by the combination of such high and low signals generated corresponding to the respective data of lens-stop values.

The data for change-over between automatic exposure control mode and manual exposure control mode may be generated as follows. The lens-side electrical contact 231b is connected to the lens-side mount 217 (i.e., the contact 213b is grounded). When a stop ring incorporated in the photographing lens is set in a predetermined position, the lens-side contact 231b touches the body-side contact 231a. When the stop ring is rotated from the predetermined position, the lens-side electrical contact 231b is moved away from the body-side electrical contact 231a. Thus, the data for change-over between automatic exposure control mode and manual exposure control mode is obtained on the basis of two states, namely, whether or not the lens-side electrical contact 231b touches the body-side electrical contact 231a.

These data are inputted to the controller in the camera body.

Although the aforedescribed data-transmission electrical contacts are simple in construction, the data for lens characteristic values and the data for change-over between the automatic exposure control mode and the manual exposure control mode can be securely transmitted to the camera body.

A further example of a lens-interchangeable camera having an AF capability is disclosed in Japanese Patent Unexamined Publication No. 4916/1985. FIG. 5 is a diagram showing such a camera having such an AF capability.

The camera of this type has a mechanism for automatically moving a lens of the photographing lens group to the focused position. More exactly, the photographing lens 241 for the AF camera has a plurality of lens elements including a lens 243 movable for focusing, a motive power transmitting device 245 for moving the movable lens 243, and a ROM (read-only memory) 247 for storing information (called "lens characteristic data") such as data indicative of open or minimum lens-stop values of the photographing lens 241, data indicative of photographic conditions corresponding to the position of the lens while being moved for focusing, and the like.

On the other hand, the camera body 251 of the AF camera includes a controller 253 for effecting AE and AF operations, an actuator 55 for moving the lens of the photographing lens group to the focused position, and other necessary parts.

In the prior art, photographing lenses of a type provided with an AF capability have been designed to be used together with an exclusive camera body 251. Accordingly, various kinds of data necessary for AE and AF control must be transmitted through exclusive data-transmission electrical contacts 261.

For the benefit of the camera user, it is desired that expensive camera bodies and photographing lenses be interchangeable so that they need not be replaced by new products whenever new bodies or lenses appear on the market. However, in the prior art photographing lens having an AF mechanism, a problem exists in that the photographing lens is not interchangeable with both a camera body having an AE capability and a camera body having an AF capability.

Therefore, an object of the present invention is to provide a rear converter which not only makes AE photographing possible, but also enables a conventional photographing lens having an AE capability to carry out AF photographing by installing the rear converter between a camera body having an AF function and a conventional photographing lens.

Further, it is desired that rear converter be usable for a combination of a camera body and a photographing lens respectively selected from various camera bodies and various photographing lenses, regardless of whether the camera body and the photographing lens have an AE or an AF capability.

Such a demand cannot be satisfied by conventional rear converters.

Therefore, an object of the present invention is to provide a rear converter which can be used between a camera body and a photographing lens regardless of whether the camera body and the photographing lens have an AF capability or not.

As will be apparent from the above description, a rear converter attached between a camera body and photographing lens having such data-transmission electric contacts also requires data-transmission electric contacts provided in the same manner as those described above for the camera body and photographing lens.

In the following, a conventional rear converter installed between the aforementioned camera body 211 and photographing lens 215 will be described with reference to FIG. 6, which is a schematic block diagram showing the conventional rear converter.

In FIG. 6, reference numeral 311 designates a conventional rear converter. The rear converter has a body mount 313 for attachment to a mount of the camera body 211 as described above, a lens mount 315 for attachment to a mount of the photographing lens 215 as described above, and a fixed lens system 317 composed of a plurality of lenses for changing the focal length of the photographing lens 215. The body mount 313 of the rear converter 311 includes an electrical contact group 327 corresponding to the electrical contact group 227 of the camera body 211, and an electrical contact 331a corresponding to the electrical contact 231a of the camera body 211. The lens mount 315 of the rear converter 311 includes an electrical contact group 329 corresponding to the electrical contact group 229 of the photographing lens 215, and an electrical contact 331b corresponding to the electrical contact 231b of the photographing lens 215.

Each of the contacts 321a, 322a, 323a, 324a and 325a is incapable of projecting from the body mount 313 and is electrically insulated from the body mount 313. Each of the contacts 321b; 322b, 323b, 324b and 325b is capable of projecting from the lens mount 315 and is electrically insulated from the lens mount 315.

The electrical contacts 321a, 322a, 323a, 324a and 325a, as constituent members of the electrical contact group 327, are respectively electrically connected to the electrical contacts 321b, 222b, 323b, 324b and 325b, as constituent members of the electric contact group 329.

Accordingly, the change in the focal length of the photographing lens 15 and the transmission of data such as lens-stop data between the camera body 11 and photographing lens 15 can be attained.

SUMMARY OF THE INVENTION

To attain the above and other objects, a rear converter according to the present invention converter comprises:

a body mount matable with a camera body mount;

a lens mount matable with a photographing lens mount of a photographing lens;

a lens system including an automatic focusing movable lens;

storing means for storing at least characteristic data for said rear converter;

a first group of electrical contacts provided on said body mount, said first group of electrical contacts being capable of electrically contacting with electrical contacts provided on said camera body mount;

a second group of electrical contacts provided on said lens mount for transmitting a signal for identifying said photographing lens to said storing means, said second group of electrical contacts being capable of electrically contacting with electrical contacts provided on said photographing lens;

a first electrical contact provided on said body mount;

a second electrical contact provided on said lens mount and grounded electrically; and driving force transmitting means for transmitting driving force from said camera body to said movable lens.

In realizing the present invention, it is preferable that the first group of electrical contacts are incapable of projecting from a plane of the body mount, the lens ROM control electrical contact is capable of projecting from the plane of the body mount, and the second group of electrical contacts and the photographing lens control electrical contact are capable of projecting from the plane of the lens mount.

It is now assumed that the thus-arranged rear converter is mounted between a camera body having an AF capability and a conventional photographing lens having no AF capability.

A voltage for driving the lens ROM can be supplied from the camera body through the lens ROM control contact.

In the case where the photographing lens is provided with, for example, a lens ROM, the photographing lens control contact can make the lens ROM electrically grounded to thereby disable its function.

The signal for identifying the type of the photographing lens is transmitted to the lens ROM of the rear converter through the second group of electrical contacts.

In the camera body, a control operation for AE photographing is carried out based on these data. Further, the automatic focusing lens within the rear converter is actuated in accordance with an automatic focusing function in the AF mode.

To further attain the above and other objects, according to the present invention, a rear converter is provided having a body mount matable with a camera body mount, a lens mount matable with a photographing lens mount of a photographing lens, and a fixed lens system for changing the focal length of the photographing lens, which rear converter comprises:

storing means for storing at least characteristic data of the fixed lens system;

a first group of electrical contacts provided on said camera body mount and respectively connected to different signal terminals of said storing means, said first group of electrical contacts being capable of electrically contacting with electrical contacts provided on said camera body mount;

a first electrical contact provided on said body mount;

a second group of electrical contacts provided on said lens mount and connected to said first group of electric contacts, said second group of electrical contacts being capable of electrically contacting with electrical contacts provided on said photographing lens mount;

a second electrical contact provided on said lens mount and connected to said first electrical contact; and driving force transmitting means for transmitting driving force from said camera body to said photographing lens.

In realizing the present invention, it is preferable that the first group of electrical contacts be constructed so as to be incapable of projecting from the surface of the body mount, the lens ROM control electric contact capable of projecting from the surface of the body mount, and the second group of electric contacts and the photographing lens control electric contact capable of projecting from the surface of the lens mount.

According to the aforementioned construction, the same signal is transmitted to the lens ROM of the rear converter through the lens ROM control electrical contact and to the photographing lens through the photographing lens control electrical contact. For example, in the case of an AF photographing lens, this electrical signal can be a common source voltage applied to both the lens ROM of the rear converter and the lens ROM of the photographing lens. Further, whether the photographing lens has an AF capability or not can be detected by controlling the voltage at the photographing lens control electrical contact.

Data transmission between the camera body and the rear converter and data transmission between the camera body and the photographing lens can be carried out through the first electrical contact group and the second electrical contact group, respectively.

Moreover, in the case where the rear converter of the invention is installed between an AF photographing lens and a camera body having an AF capability, driving force can be transmitted from the camera body to the photographing lens by the driving force transmitting means of the rear converter.

BRIEF DESCRIPTION OF THE DRAWINGS

FIGS. 3 and 4 are sectional views showing data-transmission electric contacts relevant to both the prior art and the present invention;

FIG. 5 is a block diagram showing a conventional camera having an AF function;

FIG. 18 is a block diagram showing another example of the use of the rear converter according to the present invention; and FIG. 19 is a block diagram showing a still further example of the use of the rear converter according to the present invention.

DESCRIPTION OF THE PREFERRED EMBODIMENTS

Figure 1:
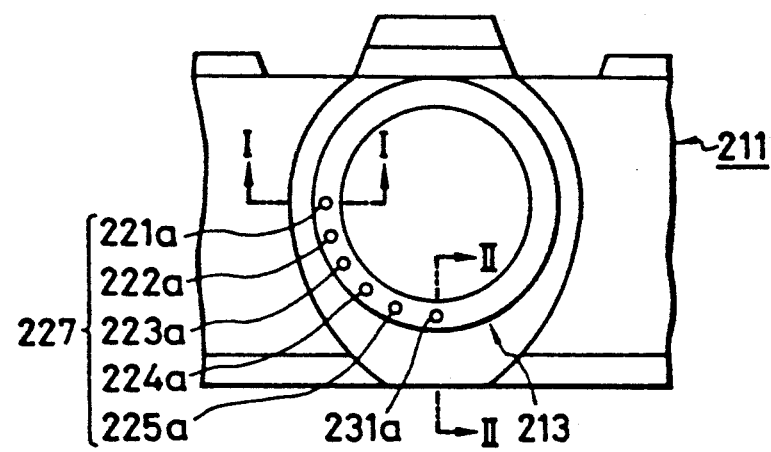
FIGS. 1 and 2 are diagrams used for explaining a conventional camera having an AE capability.

Preferred embodiments of the present invention will now be described in detail with reference to the drawings. The drawings are for the purpose of illustration and not of limitation, and parts conventionally provided in the rear converter, in the camera body, or in the photographing lens are sometimes omitted from the drawings for clarity.

Further, it is a matter of course that the size, shape and arrangement of parts are not limited to those of the illustrated examples. Like constituent components in the drawings are correspondingly referenced.

Figure 7:
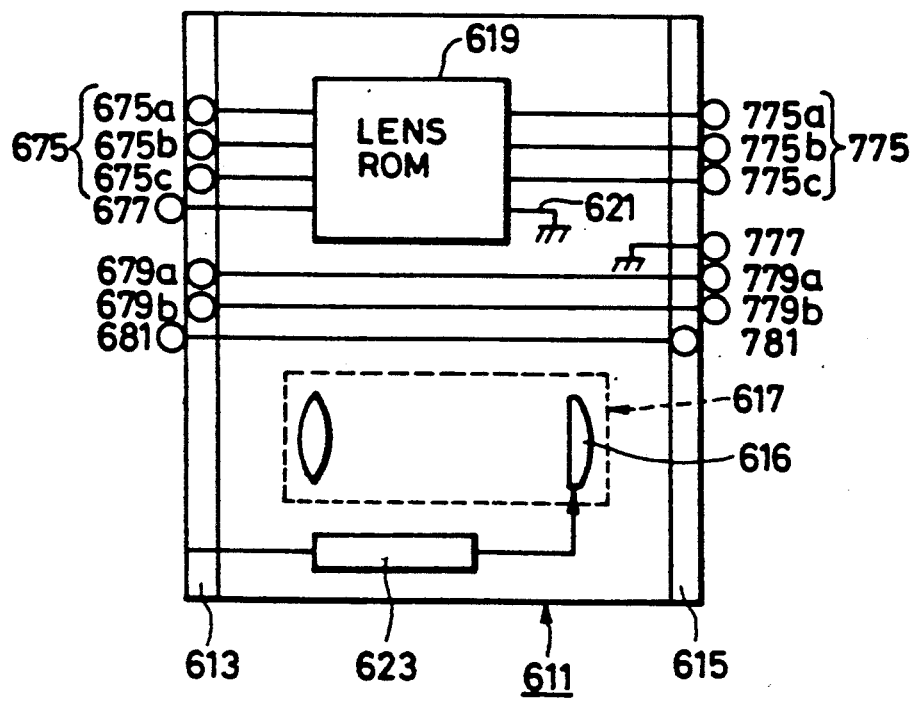
FIG. 7 is a block diagram showing a rear converter of the present invention.

FIG. 7 is a block diagram showing a first preferred embodiment of a rear converter constructed according to the present invention.

In FIG. 7 reference numeral 611 designates a rear converter of the present invention. The rear converter 611 has a body mount 613 which is to be mated, for example, with a mount 213 of the camera body 211 as described with respect to FIG. 1, a lens mount 615 which is to be mated, for example, with a mount 217 of the photographing lens 215 as described with respect to FIG. 2, a lens system 617 including a lens 616 automatically movable for focusing, and a lens ROM 619 for storing the characteristic data of the lens system 617. Each of the body mount 613 and the lens mount 615 is made of a commonly known material. These mounts 613 and 615 are electrically connected to each other, for example, through a conductive connection bar functioning as an electrical ground.

In FIG. 7, reference numeral 675 designates a first group of electrical contacts provided on the body mount 613 and respectively connected to different data terminals of the lens ROM 619. In this embodiment, the first electrical contact group 675 is composed of three electrical contacts 675a, 675b and 675c.

Reference numeral 775 designates a second group of electrical contacts provided on the lens mount 615 and used to transmit a signal to the lens ROM 619 for the purpose of identifying the photographing lens attached to the lens mount. In this embodiment, the second electrical contact group 775 is composed of three contacts 775a, 775b and 775c. The identification signal is here composed of three bits, and hence photographing lenses used can be classified into eight types. The characteristic data corresponding to the eight types of photographing lenses can be preliminarily stored in the lens ROM 619. The electrical contacts 775a, 775b and 775c are respectively connected to data terminals of the lens ROM 619 in order to access the characteristic data of the photographing lens stored therein.

The lens ROM 619 may be assigned by the signal representing an open lens-stop value of the photographing lens which is transmitted through the second electrical contact group 775 from the photographing lens, and data which has been stored in an address assigned by the signal in the ROM 619 is transmitted through the first group of electrical contacts 675 to the camera body.

Reference numeral 677 designates an electrical contact provided on the body mount 613 for controlling the lens ROM 619. For example, the lens ROM control electrical contact 677 acts to supply a source voltage from the camera body to the lens ROM 619. When such a source voltage is supplied through the control electric contact 677, the lens ROM 619 is made operative.

Reference numeral 777 designates a photographing lens control contact provided on the lens mount 615. The photographing lens control contact 777 is electrically grounded, for example, through a connection to the lens mount 615. The function of the electrical contact 777 will be described in detail below.

Further, the body mount 613 is provided with electrical contacts 679a, 679b and 681, and the lens mount 615 is provided with electrical contact 779a, 779b, and 781. The electric contacts 679a, 679b and 631 are electrically connected to the electric contacts 779a, 779b and 781, respectively. Through the electrical contacts 679a, 779a, 679a and 779b, for example, the minimum lens-stop value data can be transmitted from the photographing lens to the camera body. Through the electrical contacts 681 and 781, for example, the data for changeover between automatic exposure control and manual exposure control can be transmitted from the photographing lens to the camera body.

Reference numeral 621 designates a ground terminal of the lens ROM 619 which is connected, for example, to the body mount 613 or the lens mount 615.

Reference numeral 623 designates a driving force transmission mechanism. Driving force generated from a driving source such as an electric motor or the like in the camera body is transmitted to the movable lens 616 of the rear converter 611 by the transmission mechanism 623, whereby the movable lens 616 is automatically moved for focusing.

An example of the transmission mechanism will now be explained.

A clutch mechanism is provided in each of the camera body and the rear converter. The driving force from the camera body is transmitted to the rear converter through the clutch mechanism. The driving force thus transmitted is converted into a force for moving the movable lens in the direction of the optical axis by a gearing mechanism, helicoid screws, and the like.

It is a matter of course that various changes in the construction of the transmission mechanism may be made in accordance with design dictates and desires. In this embodiment, the electrical contacts designated by the reference numerals 675a, 675b, 675c, 679a, 679b and 681 are provided on the body mount 613 in the same arrangement and with the same mechanical construction as described above with respect to the contacts 221b, 222b, 223b, 224b, 225b and 231b in FIGS. 2 to 4. In other words, the respective contacts 675a, 675b, 675c, 679a and 679b are electrically insulated from the mount 613 and are constructed so as to be incapable of projecting from the surface of the mount 613. Further, the other contact 681 is electrically insulated from the mount 613 and is capable of projecting from the mount 613. The contact 681 may be capable of being retractable therefrom. On the other hand, the lens ROM control contact 677 is installed at a predetermined position of the mount 613 so as to be capable of projecting from the mount 613 while it is electrically insulated from the mount 613.

Figure 2:
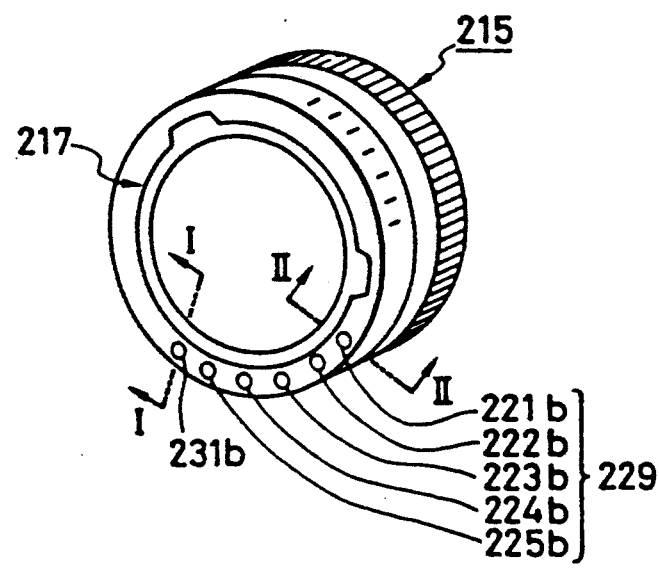
Figure 6:
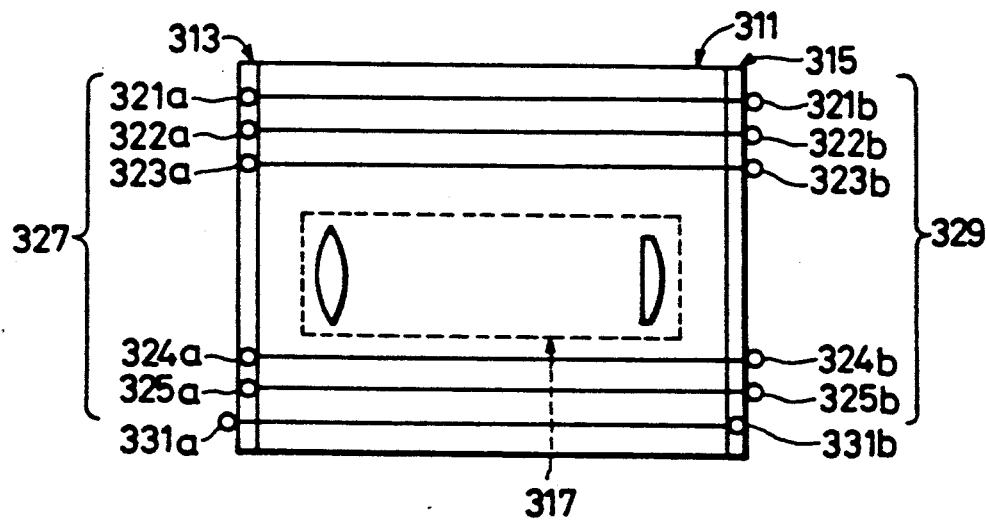
FIG. 6 is a schematic block diagram of a conventional rear converter.

Further, the contacts designated by reference numerals 775a, 775b, 775c, 779a, 779b and 781 are provided on the lens mount 615 in the same arrangement and manner as the contacts 221a, 222a, 223a, 224a, 225a and 231a in FIGS. 1, 3 and 4. In other words, the respective contacts 775a, 775b, 775c, 779a and 779b are electrically insulated from the mount 615 and are arranged so as to be capable of projecting from the surface of the mount 615. Further, the other contact 781 is electrically insulated from the mount 615 and is incapable of projecting from the mount 615. On the other hand, the lens ROM control electrical contact 777 is provided at a predetermined position on the mount 615 and is capable of projecting from the mount 615, while it is electrically insulated from the mount 615.

Example of Use of Rear Converter

Subsequently, an example of the use of the aforementioned rear converter will be explained.

An example of a camera body suitable for use with the rear converter according to the invention is a camera body having an AF capability, as described below with respect to FIG. 8. Examples of photographing lens suitable for use with the rear converter according to the invention include a photographing lens such as described above with respect to FIG. 2, and a photographing lens having an AF capability as described below with reference to FIG. 10.

Camera Body having AF Function

An example of a camera body having an AF capability suitable for the rear converter 611 according to the invention will be now described with reference to FIGS. 8 and 9. FIG. 8 is a block diagram showing the internal construction of the AF body, and FIG. 9 is a schematic front view showing a main part of the AF body.

The AF body 101 includes electrical contacts 175a, 175b and 175c corresponding to the contacts 675a, 675b and 675c of the rear converter 61 (refer to FIG. 7) of the invention, an identification electrical contact 177 corresponding to the lens ROM control electrical contact 677 of the rear converter, and electrical contacts 179a, 179b and 181 corresponding to the electrical contacts 679a, 679b and 681 of the rear converter. Each of the electrical contacts is provided on the mount 103 of the AF body 101. Further, the AF body 101 has a controller portion 105 for carrying out photographing in either the AF or AE mode, and a lens actuator 107 for actuating the movable lens 616 of the rear converter 611, as well as other parts.

Figure 9:
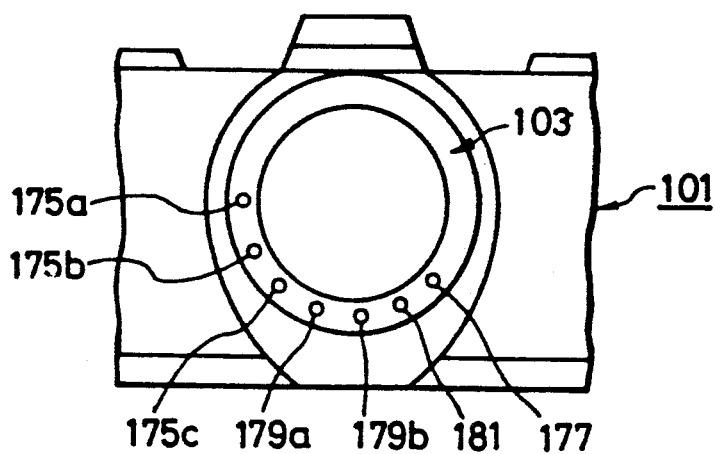
FIG. 9 is a front view showing a main part of the camera body having an AF function and which is suitable for use with the rear converter of the invention.

FIG. 9 shows the respective electrical contacts 175a, 175b, 175c, 177, 179a, 179b and 181 provided on the AF body 101. That is, the contacts 175a, 175b, 175c, 179a and 175b are provided on the mount 103 of the AF body 101 in the same arrangement and manner as described above with respect to the contacts 221a, 222a, 223a, 224a, 225a and 231b in FIG. 1. In short, the contacts 175a, 175b, 175c, 179a and 179b are electrically insulated from the mount 103 and project from the surface of the mount 103 (refer to FIG. 3). The other contact 181 is electrically insulated from the mount 103 and 181 is incapable of projecting from the surface of the mount 103 (refer to FIG. 4). The contact 177 is provided at a predetermined position on the mount 103 so as to be projectable from the mount 103, and is electrically insulated from the mount 103. The mount 103 may be made of a known material allowing it to function as an electrical ground.

Camera Lens Having AF Capability

Figure 10:
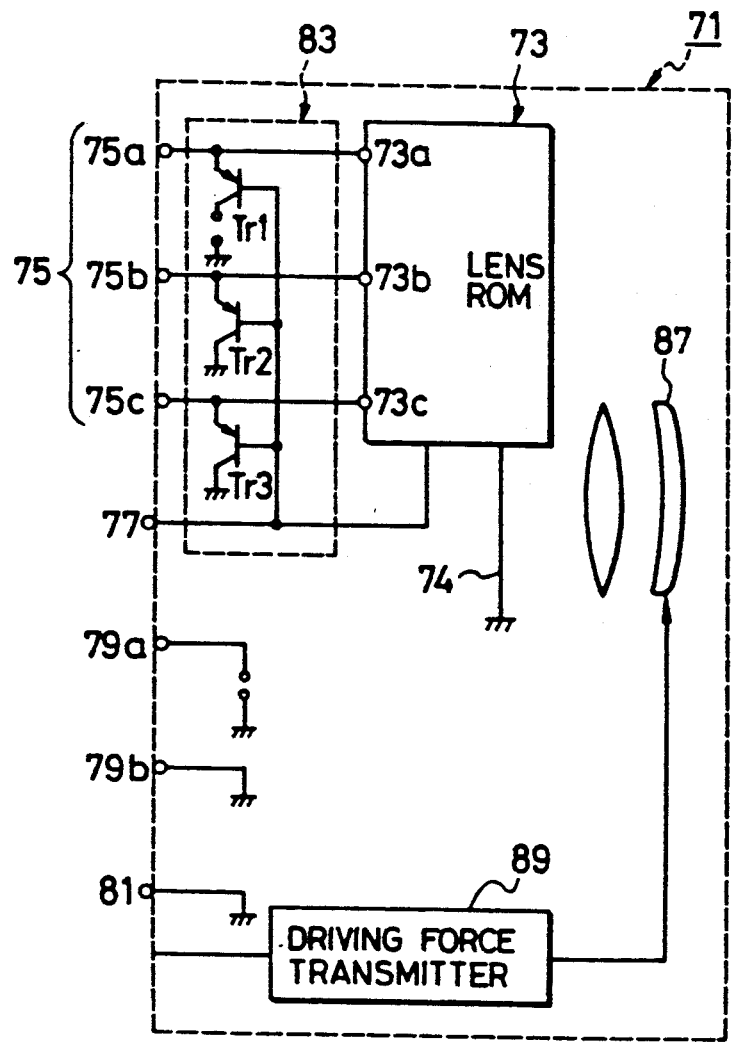
FIG. 10 is a block diagram showing a photographing lens having an AF capability and which may be used with the rear converter of the invention.
Figure 11:
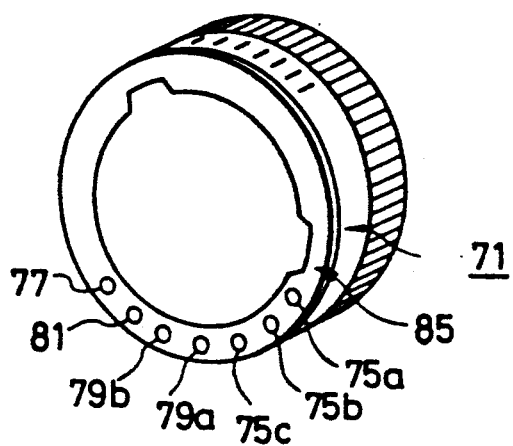
FIG. 11 is a perspective view showing a main part of a photographing lens having an AF function suitable for use with the rear converter of the invention.

Referring now to FIGS. 10 and 11, there is shown a photographing lens having an AF capability suitable for use with the rear converter 611 according to the invention. FIG. 10 is a block diagram showing the internal construction of the AF lens, and FIG. 11 is a schematic perspective view showing a main part of the AF lens.

In these drawings, reference numeral 71 designates an AF lens. Reference numeral 73 designates a lens ROM provided in the AF lens 71. The lens ROM 73 stores the lens characterizing data of the photographing lens needed to realize AE and AF operations. Reference numeral 75 designates a group of electrical contacts respectively connected to different terminals of the lens ROM 73 and corresponding to the second electrical contact group 775 of the rear converter 611. In FIGS. 10 and 11, the electrical contact group 75 is composed of three contacts 75a, 75b and 75c. Reference numeral 77 designates an electrical contact for controlling the lens ROM of the AF lens. Generally, the control electrical contact 77 is provided to feed a source voltage from the AF body 101 to the lens ROM 73. When the source voltage is fed through the control electrical contact 77, the lens ROM 73 is made operative. Reference numeral 74 designates a ground terminal. For example, the ground terminal 74 may be connected to the mount of the photographing lens.

Reference numerals 79a and 79b designate electrical contacts provided corresponding to the respective electric contacts 779a and 779b of the rear converter 611. For example, these contacts act to transmit a minimum lens-stop value to the camera body. In the case shown in FIG. 7, a binary-coded digital signal, that is, an open lens-stop value data expressed by "0" and "1", is transmitted to the camera body through the electrical contacts 79a and 79b. Reference numeral 81 designates an electrical contact corresponding to the contact 781 of the rear converter 611. The data for change-over between the automatic exposure control mode and the manual exposure control mode is transmitted to the camera body through the electric contact 81.

The installation of the respective electric contacts 75a, 75b, 75c, 79a, 79b and 81 and the control contact 77 of the photographing lens will be described with reference to FIG. 11. FIG. 11 is a perspective view showing the AF lens. As shown in FIG. 11, the respective contacts 75a, 75b, 75c, 79a, 79b and 81 are provided on the mount 85 of the AF lens 71 in the same arrangement and manner as described above with respect to the contacts 21b, 22b, 23b, 24b, 25b and 31b in FIGS. 2 to 4. In other words, the respective contacts 75a, 75b, 75c, 79a and 79b are electrically insulated from the mount 85 and are incapable of projecting from the surface of the mount 85. The other contact 81 is electrically insulated from the mount 85 and capable of projecting from the mount 85. On the other hand, the contact 77 is electrically insulated from the mount 85 and provided at a predetermined position on the mount 85 so as to be capable of projecting from the mount 85. The mount 85 may be made of a known material; it functions as an electric ground.

Reference numeral 83 designates a change-over circuit for switching the function of the electrical contact group 73. In the change-over circuit 83, the emitter of a PNP transistor Tr1 acting as an electronic switch is connected to the contact 75a, which is in turn connected to one data terminal 73a of the lens ROM 73. Similarly, the emitter of a PNP transistor Tr2 is connected to the contact 75b, which is in turn connected to another data terminal 73b, and the emitter of a PNP transistor Tr3 is connected to the contact 75c, which is connected to a further data terminal 73c. The base of each of the transistors is connected to the lens ROM control contact 77, which is connected to the lens ROM 73. Further, the collectors of the transistors are grounded or are electrically open in a pattern indicative of the type of the photographing lens. In the case illustrated in FIG. 10, the collector of the transistor Tr1 is open and the collectors of the other transistors Tr2 and Tr3 are grounded. In this case, when the electrical potential of the control contact 77 is substantially at ground potential, each of the transistors is in the ON state. If a voltage is supplied to each of the contacts 75a, 75b and 75c through a pull-up resistor in the manner described above for the conventional photographing lens, the voltage on the contact 75a will be at a high level and the voltage at each of the contacts 75b and 75c at a low level.

Further, the photographing lens 71 of the invention has a lens system containing a lens 87 movable for focusing, and a driving force transmitter 89 for transmitting driving force from the camera body to move the lens 87.

Example 1 of Use of Rear Converter

Figure 12:
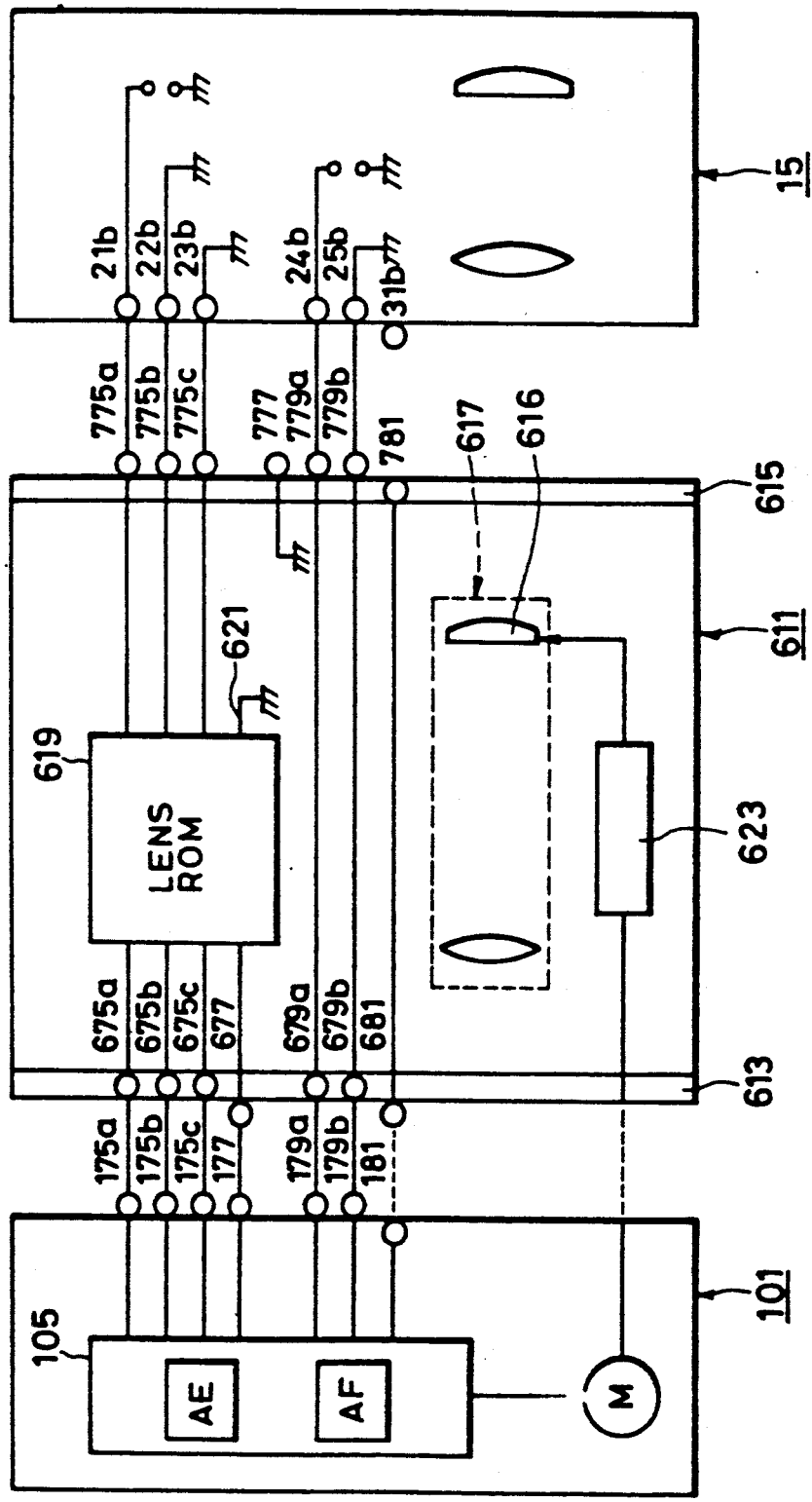
FIG. 12 is a block diagram showing an example of the use of the rear converter according to the present invention.

FIG. 12 is a block diagram showing a rear converter 611 of the invention installed between the aforementioned AF body 101 and a conventional photographing lens 15 having no AF capability, as described above with respect to FIG. 2.

In the conventional photographing lens 15, as described above, some of the contacts 21b, 22b and 23b are coated with an insulating material, while others are directly connected to the mount. Accordingly, when a predetermined voltage (for example, a source voltage for actuating the lens ROM) is applied through a pull-up resistor to each of the second group contacts 775a, 775b and 775c in the rear converter 611, the voltages at the contacts 775a, 775b and 775c are determined corresponding to whether the contacts 21b, 22b and 23b are electrically insulated or grounded. Thus, the signal for identifying the photographing lens is transmitted to the lens ROM 619 of the rear converter 611 corresponding to the combination of these voltage states. In this case, eight different combinations are possible, and hence eight different signals can be transmitted through the second contact group 775. Further, in this case, characteristic data corresponding to the eight different signals are preliminarily stored in the lens ROM 619, whereby the characteristic data can be read out corresponding to the identification signal.

A voltage is applied from the controller 105 of the AF body 101 to the lens ROM 619 of the rear converter 611 through the contacts 177 and 677 so that the lens ROM 619 can be operated in the designated manner.

For example, data transmission between the rear converter 611 and the AF body 101 can be carried out as follows. The reset signal (RE) from the controller 105 in the AF body is fed to the lens ROM 619 through the contacts 175a and 675a. Further, the clock signal (CK) from the controller 105 is applied to the lens ROM 619 through the contacts 175b and 675b.

Various types of data, such as the location data of the lens system 617 within the rear converter and the like, are serially transmitted from the lens ROM 619 in the rear converter 611 to the controller 105 in the camera body through the contacts 675c and 175c corresponding to the reset signal and clock signal.

Further, the minimum lens-stop value data is transmitted from the photographing lens 15 to 105 through the contacts 24b, 779a, 679a and 179a and the contacts 25b, 779b, 679b and 179b.

The data for change-over between automatic lens-stop control and manual lens-stop control is discriminated or transmitted by whether the contact 31b of the photographing lens is in touch with the contact 781 of the rear converter 611 or out of touch from the contact 731 when the stop ring (not shown) of the photographing lens 15 is turned. In this case, the contact 681 of the rear converter 611 is preliminarily made to touch the contact 181 of the camera body 101.

The driving force from the drive source 107 installed in the AF body 101 is transmitted to the movable lens 616 by the driving force transmitter 623 of the rear converter. Thus, the movable lens 616 is moved to a focused position.

With the aforementioned construction, photographing in either the AF or AE mode can be carried out even in the case where a conventional lens having no AF function is used.

Example 2 of Use of Rear Converter

Figure 13:
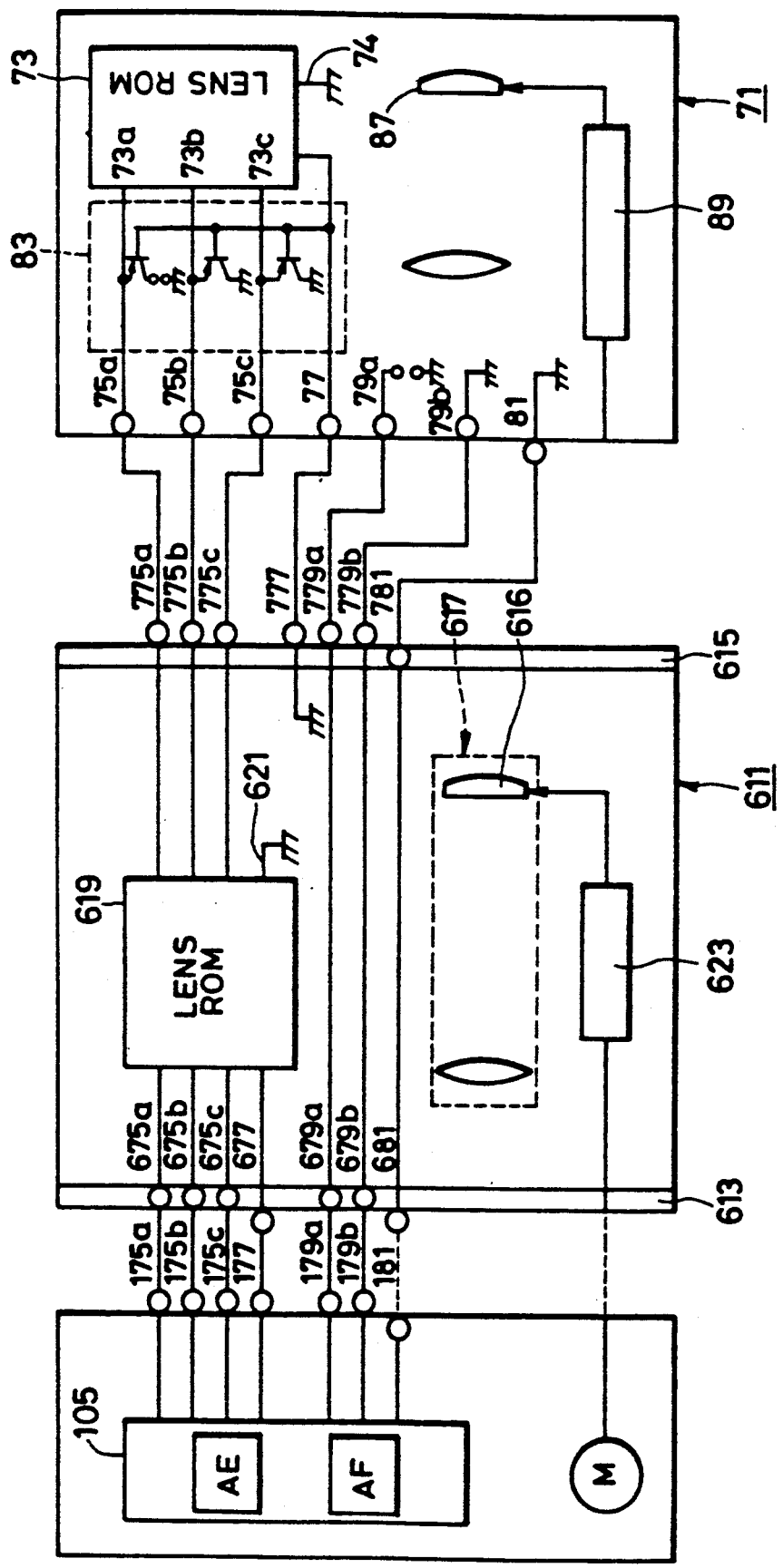
FIG. 13 is a block diagram showing an example of the use of the rear converter according to the present invention.

FIG. 13 is a block diagram showing the rear converter 61 constructed according to the invention installed between the aforementioned AF body 101 and AF lens 71.

The electric contact 77 provided on the lens mount 615 is electrically grounded so that the lens ROM control electrical contact 77 of the AF lens 71, which touches the contact 777, is also electrically grounded. Accordingly, the lens ROM 73 within the AF lens 71 is rendered inoperative. On the other hand, the respective PNP transistors of the change-over circuit 83 within the AF lens 71 are placed in the ON state. In this condition, when a predetermined voltage (for example, a source voltage for actuating the lens ROM) is applied through a pull-up resistor to each of the second group of contacts 775a, 775b, and 775c in the rear converter 611, the voltages at the contacts 775a, 775b and 775c are respectively determined corresponding to whether or not the collectors of the PNP transistors are grounded, as described above with respect to FIG. 10. Thus, the signal for identifying the photographing lens is transmitted to the lens ROM 619 of the rear converter 611 corresponding to the combination of the voltage conditions.

In the above described examples of FIGS. 12 and 13, in the case where the electrical contacts 179a and 179b which are provided on the camera body to receive data representing a minimum lens stop value, are grounded through the body mount 613 of the rear converter, a predetermined minimum lens stop value, F22 for instance is sent to the camera body.

The other required operations can be carried out in the same manner as described above for Example 1 with respect to FIG. 12.

Figure 14:
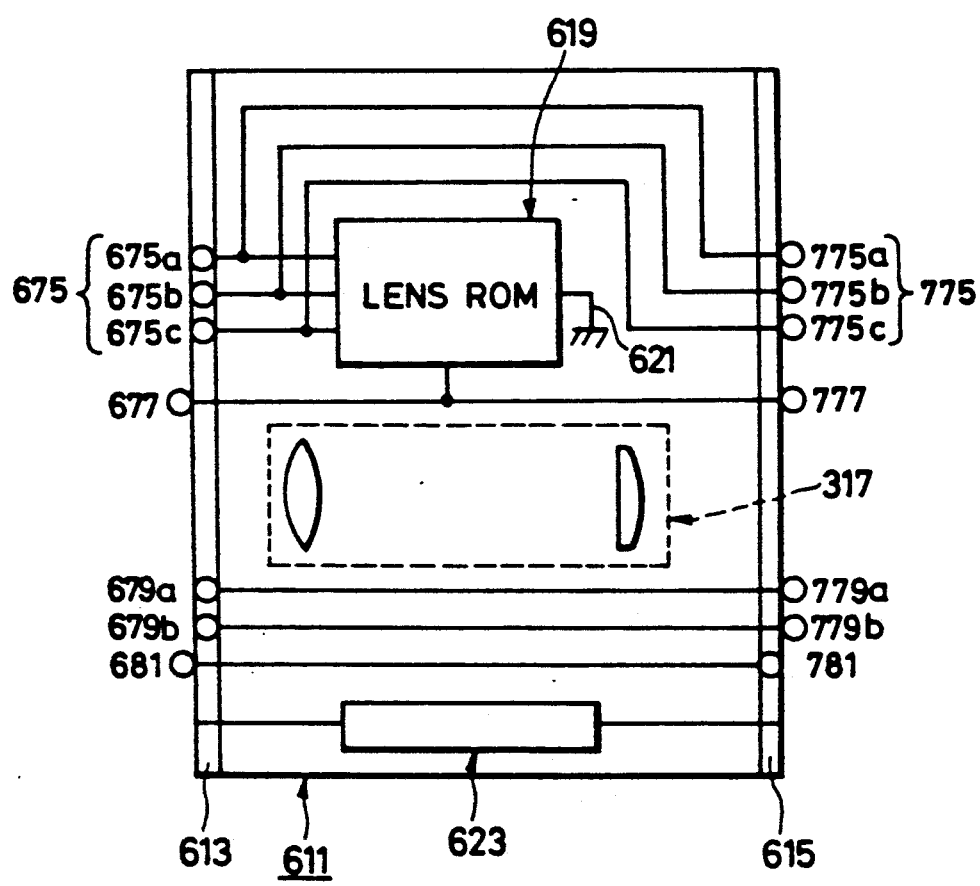
FIG. 14 is a block diagram of another embodiment of a rear converter of the invention.

FIG. 14 is a block diagram showing another embodiment of the rear converter according to the present invention, in which parts the same as those in FIG. 1 bear the same reference numerals.

In the embodiment of FIG. 14, the electrical contacts 775a, 775b and 775c are electrically connected to the electric contacts 675a, 675b and 675c, respectively.

Reference numeral 677 designates an electrical contact provided on the body mount for controlling the lens ROM 619. For example, the lens ROM control electrical contact 677 acts to supply a source voltage from the camera body to the lens ROM 619. When such a source voltage is supplied through the control electrical contact 677, the lens ROM 619 is rendered operative.

Reference numeral 777 designates a photographing lens control contact provided on the lens mount. The photographing lens control contact 777 is electrically connected to the lens ROM control contact 677.

The electrical contacts 677 and 777 are capable of projecting from planes of the body mount and the lens mount, respectively.

Reference numeral 623 designates a driving force transmitting mechanism. In the case where the rear converter 611 of the invention is installed between a camera body having an AF capability and a photographing lens having an AF capability, a driving force generated by a driving source such as an electric motor or the like in the camera body is transmitted to a movable lens contained in the photographing lens through the transmitting mechanism, whereby the movable lens can be automatically moved for focusing.

An example of the transmitting mechanism will now be explained.

A rotatable shaft is installed in the rear converter 611 extending from the body mount to the lens mount. Clutch mechanisms are provided at opposite ends of the shaft, that is, at two mount portions of the shaft. With this clutch mechanism, one end of the shaft can be connected to a driving force source, for example, a motor, installed in the camera body, and the other end of the shaft can be connected to a driving mechanism installed in the photographing lens. It is a matter of course that various changes in the construction of the transmitting mechanism may be made in accordance with design dictates and desires.

An example of the use of the aforementioned rear converter will now be explained. Examples of a camera body suitable for use with the rear converter 611 include a camera body as described above with respect to FIG. 1, and a camera body having an AF mechanism as described with respect to FIG. 8. Examples of photographing lenses suitable for use with the rear converter 611 include a photographing lens as described above with respect to FIG. 2, and a photographing lens having an AF capability as described below with respect to FIG. 11.

Figure 8:
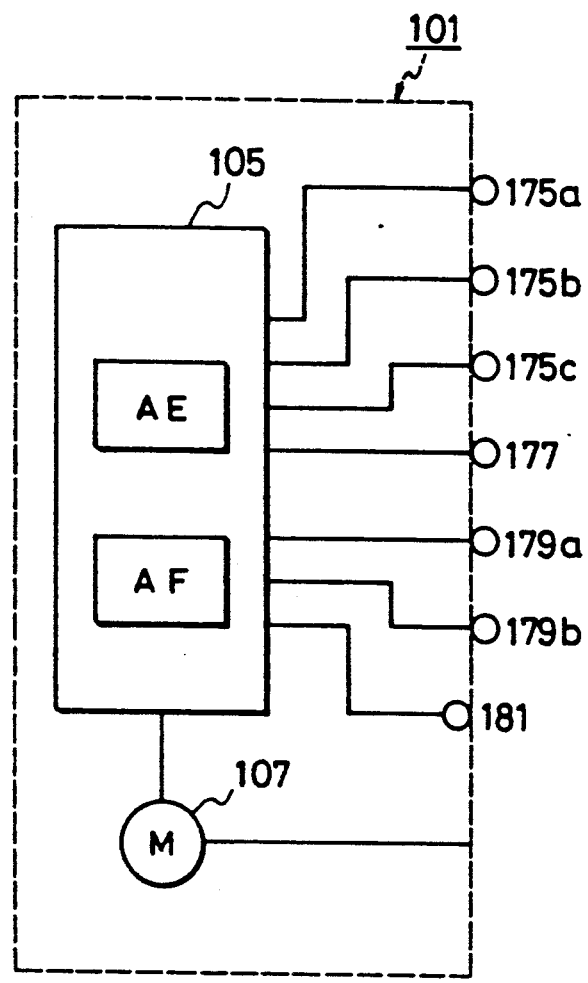
FIG. 8 is a block diagram showing a camera body having an AF capability and which is suitable for use with the rear converter of the invention.

An example of the AF camera body is shown in FIGS. 8 and 9.

Figure 15:
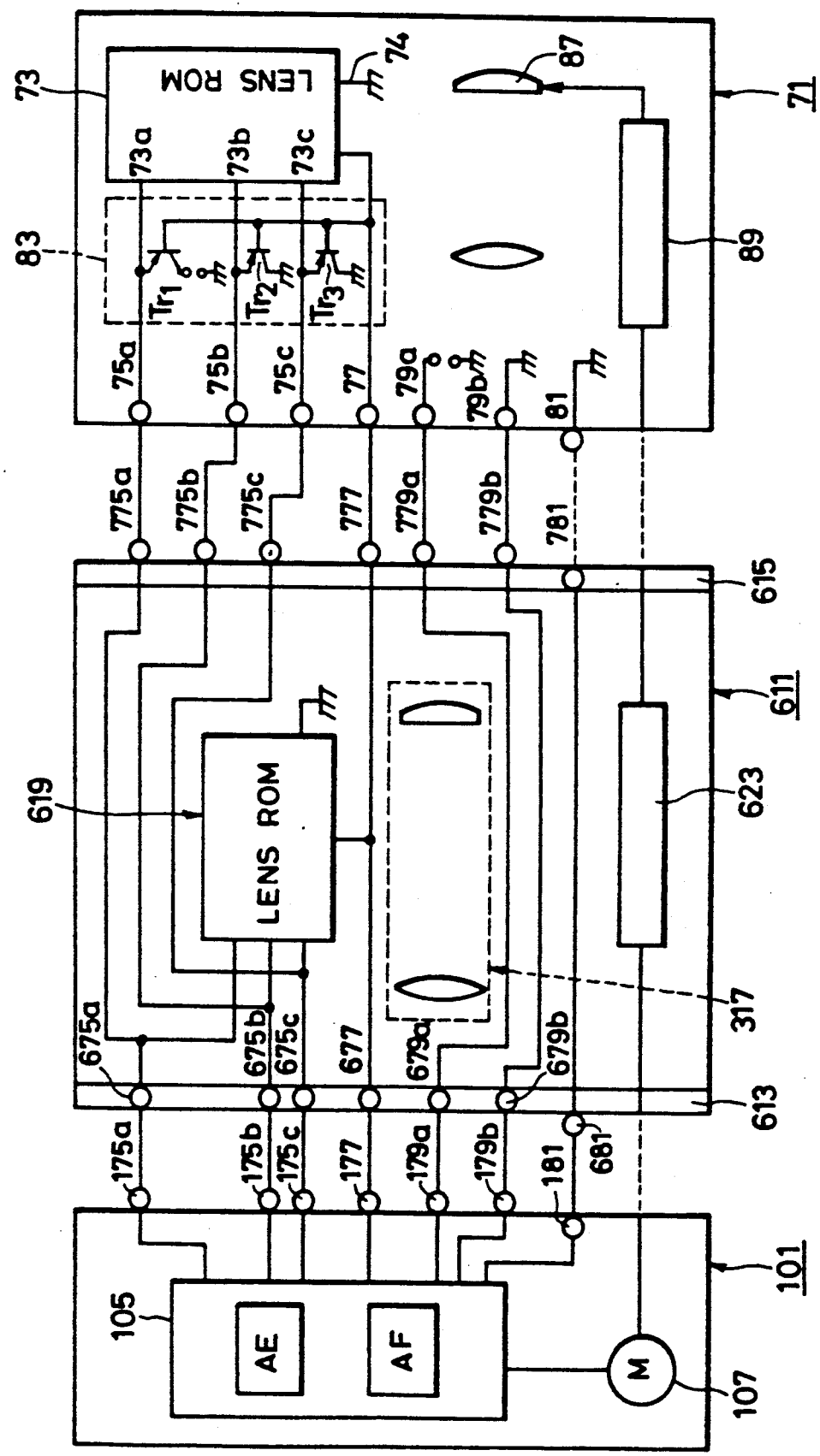
FIG. 15 is a block diagram showing the connection of the rear converter of FIG. 14 to a camera body and photographing lens.

FIG. 15 is a typical block diagram showing the rear converter 611 according to this embodiment of the invention installed between the AF body 101 and the AF lens 71.

In such a construction, a voltage (for example, +5 volts) for actuating the lens ROM is applied from the controller portion 105 of the AF body 101 to the lens ROM 619 through the contacts 177 and 677, and at the same time, the same voltage is applied to the lens ROM 73 of the AF lens 71 through the contacts 177, 677, 777 and 77. Also, the voltage is applied to the bases of the PNP transistors Tr1 to Tr3 of the change-over circuit 83. Accordingly, the lens ROM 619 in the rear converter and the lens ROM 73 in the AF lens respectively operate in the designated manner. Each of the transistors Tr1 to Tr3 in the change-over circuit 83 of teh AF lens 71 is placed in the OFF state. Accordingly, a circuit between the contact 75a and the terminal 73a, a circuit between the contact 75b and the terminal 73b, and a circuit between the contact 75c and the terminal 73c become operative, and hence the circuit between the controller portion 105 of the AF body 101 and the lens ROM 73 of the photographing lens 71 is rendered operative.

For example, data transmission between the AF body 101 and the AF lens 71 through the rear converter 611 can be carried out as follows. The reset signal (RE) from the controller 105 in the AF body is applied to the lens ROM 619 through the contacts 175a and 675a and simultaneously fed to the lens ROM 73 of the AF lens through the contacts 175a, 675a, 775a and 75a with a predetermined period. Further, the clock signal (CK) from the controller 105 in the AF body is supplied to the lens ROM 619 through the contacts 175b and 675b and simultaneously fed to the lens ROM 73 of the AF lens through the contacts 175b, 675b, 775b and 75b.

Data transmission from the respective lens ROMs 619 and 73 to the camera body 101 can be carried out as follows. Data transmission from the lens ROM 619 of the rear converter 611 to the controller portion 105 of the camera body is effected through the contacts 675c and 175c. Data transmission from the lens ROM 73 of the AF lens 71 to the controller portion 105 of the camera body is done through the contacts 75c, 775c, 675c and 175c.

Figure 16:
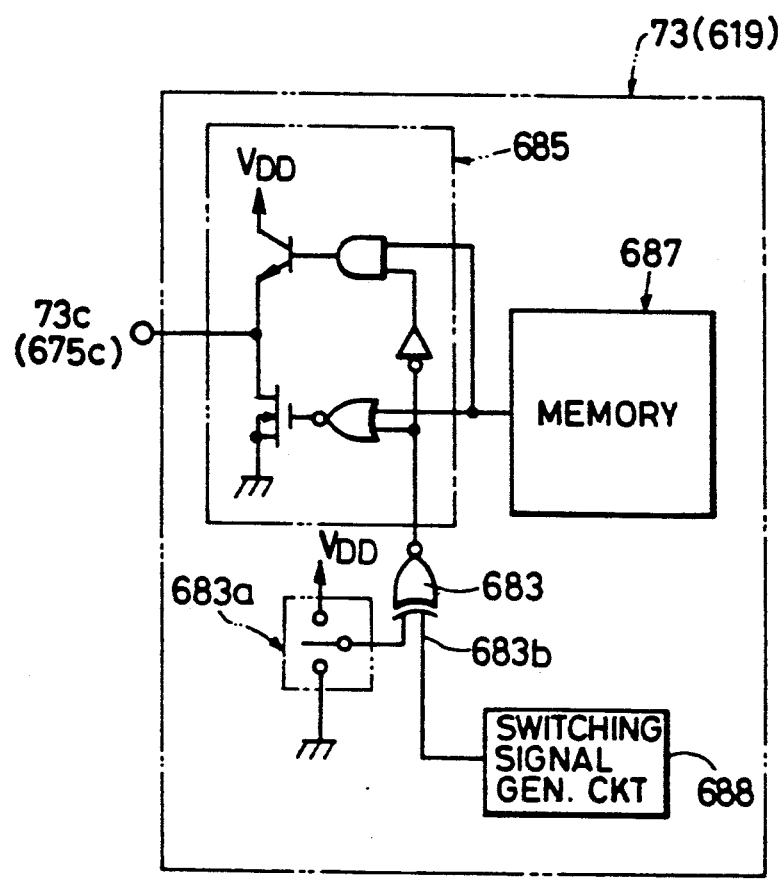
FIG. 16 is a block diagram showing a main part of the circuit construction of a lens ROM relevant to the present invention.
Figure 17:
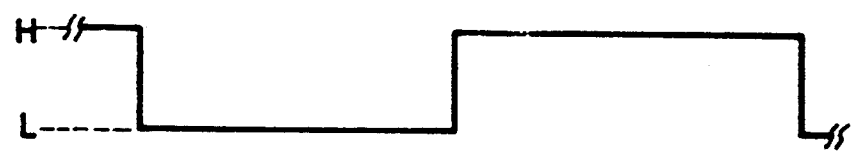
FIG. 17 is a signal waveform diagram for explaining the data transmission between the AF body and the lens ROM.

In the following discussion, an example circuit and a process for transferring the lens characteristic data to the controller portion 105 in the camera body 101 will be described with reference to FIGS. 16 and 17, of which FIG. 16 is a partly cut-away block diagram showing the internal construction of each of the lens ROMs 73 and 619, and FIG. 17 is a waveform diagram showing a switching signal applied to the respective lens ROMs.

With respect to the internal circuit diagram, for example, the lens ROMs 73 and 619 are similar to each other except for an input terminal of the gate circuit receiving the clock signal. In other words, one input terminal 683a of the exclusive-OR circuit 683 as shown in FIG. 16 in the lens ROM 73 of the AF lens is connected to the electrical source potential ($V_{DD}$), and such input terminal 683a in the lens ROM 619 of the rear converter is grounded. The connection of the input terminal 683a can be easily changed during masking operations while producing the circuits in IC form. Accordingly, ICs used for the lens ROMs respectively installed in the AF lens and the rear converter may have substantially the same structure.

For example, when a switching signal as shown in FIG. 17, which is produced by a switching signal generating means 688, is simultaneously applied to another input terminal 683b of the gate circuit 683 in each of the lens ROMs 73 and 619, the logical conditions at the output terminals of the respective gate circuits 683 are made different from each other. Accordingly, the lens ROMs are alternately operated so that, when the output circuit 685 of one lens ROM is operative, the output circuits of the other lens ROM is inoperative. Further, data inputted to the controller 105 of the camera body 101 are used as data relating to the AF lens 71 and as data relating to the lens system 617 within the rear converter. For example, if the inputted data is composed of 32 bytes, the first 16 bytes can be allocated as data for the AF lens and the last 16 bytes allocated as other data for the rear converter.

In such a construction, if the transmission of the data to be inputted to the controller 105 is started in response to the aforementioned reset signal and clock signal, information stored in a memory 687 can be outputted through the operative-side output circuit portion. Accordingly, designated information can be serially transmitted to the controller 105 of the camera body from the lens ROM 619 of the rear converter and the lens ROM 763 of the AF lens.

Further, driving force generated from the driving source 107 in the AF body 101 is transmitted to the AF lens by the driving force transmitting mechanism 623 of the rear converter 611, so that the movable lens 87 of the AF lens 71 is driven by the driving force thus transmitted.

The rear converter 611 according to this embodiment of the present invention will be described with reference to FIG. 18 with reference to the case where the rear converter 611 is installed between the afomentioned AF body 101 and a conventional photographing lens 215 as described above with respect to FIG. 2. FIG. 18 is a typical block diagram showing such a situation.

In this arrangement, because no electrical contact corresponding to the identification electric contact 177 of the camera body 101 and no electrical contact corresponding to the photographing lens control electrical contact 777 of the rear converter 611 are provided in the conventional photographing lens 215, the electrical contacts 177 and 777 directly touch the mount 217 of the lens 215. Accordingly, the contacts 177 and 777 are grounded so that the voltage at each of the contacts 177 and 777 is at the low level. When the voltage at the contact 177 is at the low level, the lens ROM 619 is rendered inoperative, and the circuit between the contacts 675a and 675a, the circuit between the contacts 675b and 775b, and the circuit between the contacts 675c and 775c made operative. Further, the controller 105 of the camera body is designed so as to not be operated by automatic focusing control when the voltage at the contact 177 is at the low level.

On the other hand, as described above, in the conventional photographing lens 215, some of the electrical contacts 221b, 222b and 223b are coated with an insulating material and others are directly connected to the mount. Accordingly, when a source voltage for driving the controller is applied to the body-side contacts 175a, 175b and 175c, the voltages at the body-side contacts 175a, 175b and 175c are determined depending on whether the contacts 221b, 222b, and 223b are electrically insulated or grounded. Thus, the open lens-stop value data of the photographing lens can be transmitted from the photographing lens to the controller 105 through the rear converter 611 corresponding to the present combination of the voltage states.

Further, the minimum lens-stop value data is transmitted to the camera body through the contacts 224b, 779a, 679a and 179a and the contacts 225b, 779b, 679b and 179b.

The data for change-over between automatic lens-stop control and manual lens-stop control is determined or transmitted to the camera body by turning the stop ring of the photographing lens according to the two states as to whether the contact 231b touches the contact 781 or not. In this case, the contact 681 of the rear converter is preliminarily electrically connected to the contact 181 of the camera body 101.

In the aforementioned construction, AE photographing can be carried out even in the case where the rear converter 611 is installed between an AF body and a conventional photographing lens.

An example of the rear converter 611 constructed according to the present invention will be further described with reference to FIGS. 8 and 19 with reference to the case where the rear converter 611 is installed between the conventional camera body 211 and the aforementioned AF lens 71.

In this configuration, the lens ROM control contact 677 of the rear converter 611 and the lens ROM control contact 77 of the AF lens are electrically connected to the mount of the camera body 211, so that the contacts 677 and 77 are grounded. Accordingly, the lens ROM 619 within the rear converter and the lens ROM 73 within the AF lens 71 are both inoperative. Thus, the electrical impedance of the data terminals 73a, 73b and 73c of the lens ROM 73 of the AF lens 71 and the similar terminals of the lens ROM 619 of the rear converter 611 are at a hgih impedance relative to the ground point. On the other hand, the respective bases of the PNP transistors Tr1 to Tr3 in the change-over circuit 83 are grounded, and thus the transistor Tr1 to Tr3 are placed in the ON state. As described above, the collectors of the transistors are connected to ground or not in a pattern identifying the type of the photographing lens, that is, for example corresponding to the open lens-stop value data of the lens. In this case, two of the collectors are grounded and the other is electrically opened. Accordingly, when a voltage (for example, +5V) is applied to each of the transistors Tr1 to Tr3 through a pull-up resistor 11a in the camera body 11 and through the electrical contacts 75a, 75b and 75c, the voltage at each of the electrical contacts 75b and 75c, which are associated with transistors having collectors grounded, is at the low level. On the other hand, the voltage at the electrical contact 75a, which is associated with the transistor having its collector opened, is at the high level. Thus, a signal expressing the open lens-stop value data is transmitted to the controller 211b in the camera body through the rear converter 611.

The minimum lens-stop value data is then transmitted to the controller 211b in the camera body through the contacts 79a779a, 679a and 224a and the contacts 79b, 779b, 679and 225b.

Further, the data for change-over between automatic lens-stop control and manual lens-stop control is detected or transmitted to the camera body by turning the stop ring (not shown) of the photographing lens according to the two states as to whether the contact 81 touches the contact 781 or not.

In the aforedescribed construction, AE photographing operations can be carried out, even in the case where the rear converter 61 is installed between a conventional camera body and an AF lens.

The rear converter 611 according to the present invention can also be installed between the conventional camera body 211 and the conventional photographing lens.

According to the aforementioned construction, the AF capability provided by the AF lens can be disabled so that photographing in both AF and AF modes can be carried out using the rear converter of this invention.

In the above described embodiments of FIGS. 15, 18 and 19, in the case where the electrical contacts 179a, 179b, 224a and 225a which are provided on the camera-body mount to receive data representing a minimum lens stop value, are grounded through the body mount 613 of the rear converter, a predetermined minimum lens stop value F22 for instance, is set to the camera body.

The rear converter according to the present invention is not limited to the aforementioned embodiment.

This is, although the aforementioned embodiment has been described with reference to the case where the first electrical contact group 675 is composed of three contacts and the second electric contact group 775 is composed of a like number, the number of electrical contacts constituting each electrical contact group may be established corresponding to the design of the camera body and the photographing lens employed.

The mechanical structures of the mounts and the electric contacts on the camera body, the photographing lens, and the rear converter in the aforementioned embodiment have been illustrated merely by way of example, and various changes to these structures may be made without departing the spirit and scope of the invention. For example, although a concave-convex shape for each of the electric contacts is illustrated above, the reverse shapes may be employed.

As described above, according to the rear converter of the present invention, when installed between an AF camera body and a conventional photographing lens having no AF function, the voltage from moving the lens for focusing is applied from the camera body to the lens ROM of the rear converter through the lens ROM control electrical contact. Further, in the case where the photographing lens has a lens ROM, the operation of the lens ROM is disabled through the photographing lens control contact so that the photographing lens operates the same as a conventional lens. Further, the signal for identifying the photographing lens is applied through the second electrical contact group. The characteristic data of the photographing lens and the characteristic data of the rear converter are transmitted to the camera body through the first electric contact group.

The automatic focusing movable lens of the rear converter is moved for focusing in response to the signal from the camera body.

Accordingly, with this construction, the invention provides a rear converter which not only makes AE photographing possible, but also makes AF photographing possible, even in the case where the rear converter is used between an AF camera body and a conventional photographing lens having no AF function.

As described above, with the rear converter of the present invention, when the converter is installed between a camera body and a photographing lens, data identifying the camera body and the type of the photographing lens are transmitted between the camera body and the photographing lens through the lens ROM control electrical contact and the photographing lens control electrical contact provided on the rear converter. From this data, it is determined whether the photographing lens has an AF capability or not, and also the determination as to whether the photographing lens has an AF capability or not can be made automatically. Further, necessary data indicating whether both the camera body and the photographing lens have an AF capability or whether one of these has no AF capability can be transmitted through the first and second electrical contact groups.

Accordingly, in the case where the rear converter is installed between an AF camera body and an AF photographing lens suitable for the rear converter are used, photographing in both the AF and AE modes can be carried out using the inventive rear converter. In the case where either the camera body or the photographing lens is of a conventional type, photographing in the AE mode can be effected using the rear converter in the prior art manner.

Consequently, the invention provides a rear converter which can be used between a camera body and a photographing lens regardless of whether the camera body and the photographing lens have an AF capability or not.

What is claimed is:

1. A rear converter comprising:
   a body mount (613) matable with a camera body mount of a camera body;
   a lens mount (615) matable with a photographing lens mount of a photographing lens;
   a fixed lens system (317) for changing the focal length of said photographing lens;
   storing means (619) for storing at least characteristic data of said fixed lens system and having a plurality of signal terminals;
   a first group of electrical contacts (675) provided on said body mount and respectively connected to different ones of said signal terminals of said storing means, said first group of electrical contacts being capable of electrically contacting with electrical contacts provided on said camera body mount;
   a first electrical contact (677) provided on said body mount and connected to another one of said signal terminals of said storing means (619) for supplying electrical power thereto, said first electrical contact being capable of projecting from a surface of said body mount, said first electrical contact being grounded when said camera body is not of an auto-focus type;
   a second group of electrical contacts (775) provided on said lens mount and connected to said first group of electrical contacts and to others of said signal terminals of said storing means, said second group of electrical contacts being capable of electrically contacting with a corresponding group of electrical contacts provided on said photographing lens mount;

a second electrical contact (777) provided on said lens mount and connected to said first electrical contact, said second electrical contact being capable of projecting from a surface of said lens mount, said second electrical contact being grounded when said photographing lens is not of the autofocus type; and driving force transmitting means (623) for transmitting driving force from said camera body to said photographing lens.

2. The rear converter as defined in claim 1 wherein said storing means comprises a read only memory (ROM).

3. The rear converter as defined in claim 1 further comprising:

a third group of electrical contacts (679) provided on said body mount, said third group of electrical contacts being capable of electrically contacting with electrical contacts provided on said camera body mount; and a fourth group of electrical contacts (779) provided on said lens mount and connected to said third group of electrical contacts, said fourth group of electrical contacts being capable of electrically contacting with electrical contacts provided on said photographing lens mount.

wherein data representing a minimum aperture value is transmitted from said photographing lens to said camera body through said third and fourth groups thereof.

4. The rear converter as defined in claim 1 further comprising:

a third electrical contact (681) provided on said body mount; and a fourth electrical contact (781) provided on said lens mount, data representing change-over between automatic exposure control mode and manual exposure control mode being transmitted from said photographing lens to said camera body through said third and fourth electrical contacts.

5. The rear converter as defined in claim 1 wherein said first and second electrical contacts are capable of projecting from planes of said body mount and said lens mount, respectively.

6. The rear converter as defined in claim 1 wherein said third electrical contact is capable of projecting from a plane of said body mount and said fourth electrical contact is incapable of projecting from a plane of said lens mount.

7. The rear converter as defined in claim 1 wherein electrical contacts which are provided on said camera body mount to receive data representing a minimum lens stop value, are grounded through said body mount of said rear converter, so that a predetermined minimum lens stop value is sent to said camera body.

8. The rear converter as defined in claim 1, wherein said first and second groups of electrical contacts include means for transmitting lens-stop information of said photographing lens to said camera body, and wherein said lens-stop information of said photographing lens is transmitted through said first and second group of electrical contacts (675, 775) to said camera body in parallel to enable auto-exposure operation by said camera body when at least one of said first and second electrical contacts (677, 777) is grounded.

9. The rear converter as defined in claim 1, wherein data stored in said storing means (619) is transmitted serially through said first group of electrical contacts (675) to said camera body when said electrical power is supplied through said first electrical contact (677) to said storing means (619).

* * * * *